United States Patent Office 3,303,258
Patented Feb. 7, 1967

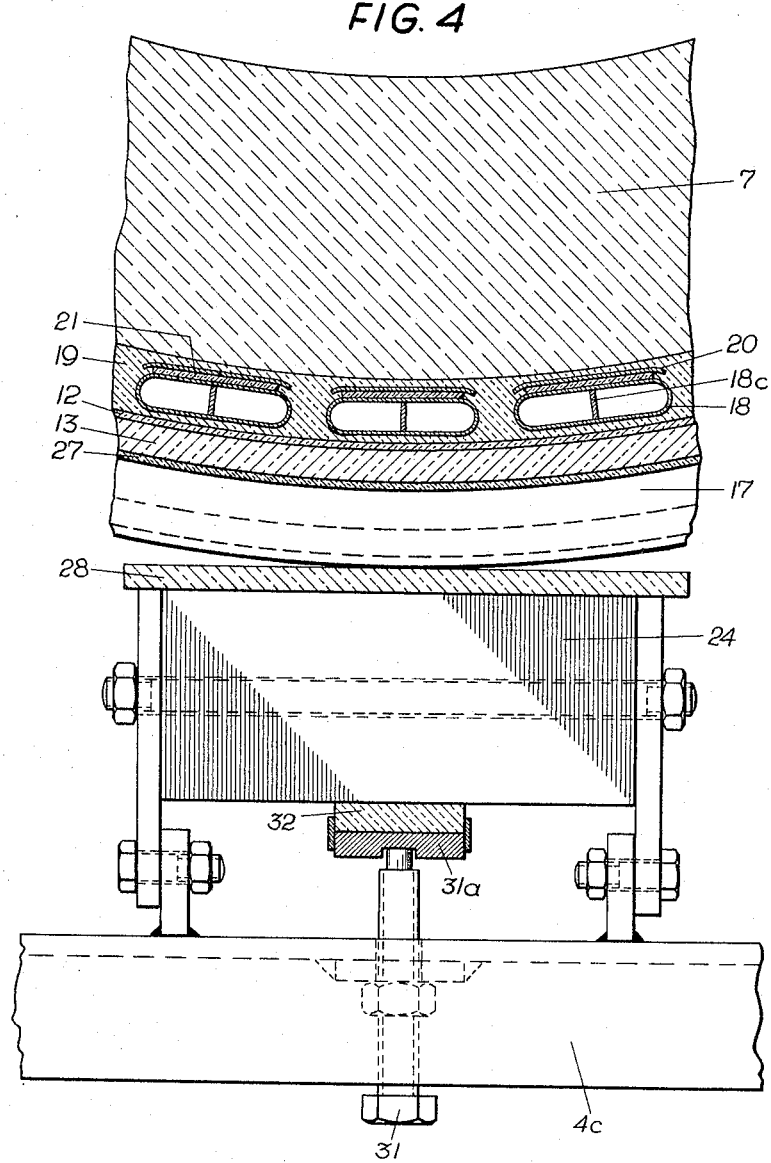

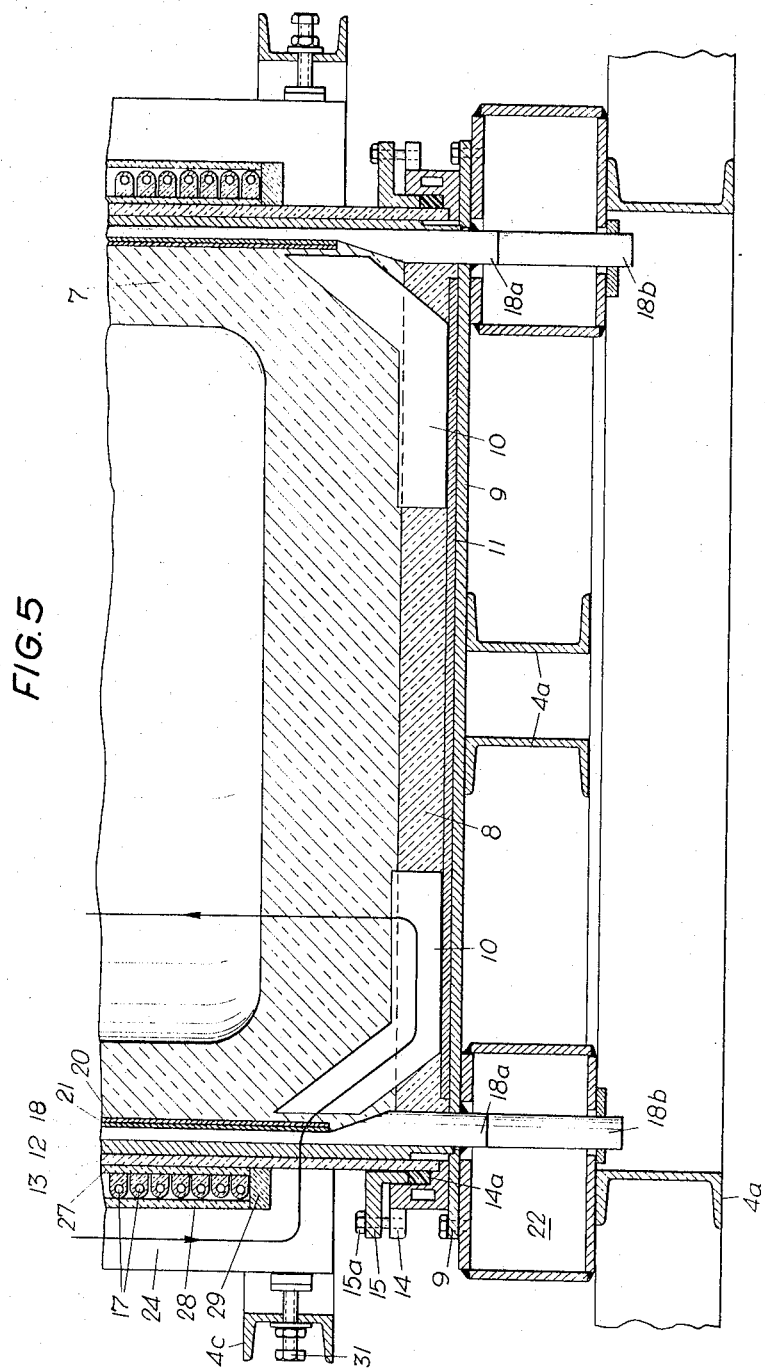

3,303,258
VACUUM INDUCTION FURNACE
Otto Junker, 5101 Lammersdorf uber Aachen, Germany
Filed June 15, 1964, Ser. No. 375,164
Claims priority, application Germany, June 20, 1963,
J 23,904
8 Claims. (Cl. 13—27)

The invention relates to vacuum induction furnaces, and relates more particularly to coreless induction vacuum furnaces for large capacity charges, for either melting or holding under rarefied air.

Reference is had to my Patent No. 3,056,847, dated October 2, 1962.

To melt, or to hold, metal under rarefied atmospheric conditions has many advantages, among which there is the removal of gaseous substances from the surface of the metal bath.

The invention relates to melting furnaces, as well as to holding furnaces, and wherever herein below one of these types is mentioned, it will be understood that this mentioning also is meant to include the other type.

For the large scale vacuum melting of steel, the use of coreless induction furnaces, especially of line frequency induction furnaces, also known as network frequency induction furnaces, of a network frequency of, for instance, about from 50–60 cycles, is particularly attractive:

These furnaces may be installed into the steel melting process before the pouring of the steel into molds; these line frequency induction furnaces may be connected with their induction coil directly to the existing network; the large, though controllable, bath movement that is characteristic of coreless induction furnaces offers the advantage that the de-gasing of the steel melt is intensified and accelerated, as the gases are constantly moved from the interior of the metal bath to the surface, where they are removed by the prevailing vacuum.

Some of the difficulties in using large capacity electric induction vacuum furnaces prior to the advent of my aforesaid Patent No. 3,056,847 are recited in that patent. Patent No. 3,056,847 relates to a coreless electric induction vacuum furnace for large capacity charges. The furnace includes an upper part and a lower part, a crucible that extends between these parts and holds the molten metal bath, a primary induction coil, and vacuum sealing means. The vacuum sealing means include a gastight sleeve between the coil and the crucible and upper and lower closures which define with the sealing means a vacuum chamber Cooling means for the sleeve are provided which are disposed adjacent the inner surface of the sleeve.

The connection to the source of rarefied air is disposed near the upper closure.

Reference is had to my three co-pending applications Ser. Nos. 375,163, 375,165 and 375,166, filed concurrently herewith.

Experience has shown that during operation of the furnace there occur within the crucible wall large pressures which are directed radially outwardly. These pressures are caused by the polymorph changes of the ceramic rammed mass of the crucible, which lead to an increase in the volume of that mass which, in turn, leads to the aforesaid outward radial pressures. This pressure may be transmitted, to their detriment, to cooling tubes which are built into that mass adjacent the inner surface of the sealing sleeve. These cooling tubes serve to cool the sleeve particularly at the inner surface thereof.

In order to increase the cooling surface of the cooling tubes adjacent the inner surface of the sleeve, it has been proposed merely to flatten the tubes in the radial direction. This proposal, however, cannot be followed, because the aforesaid outward radial pressures may be so large that they may completely crush the tubes, thereby endangering the cooling effect of the tubes.

Another proposal, namely to increase the thickness of the tube wall, also did not prove effective, because the increased wall thickness gave rise to increased heat generated by the flux, as these cooling tubes are positioned within the electro-magnetic field of the induction coil.

It is accordingly among the principal objects of the invention to provide, adjacet the inner surface of the sleeve, cooling tubes which are not only flattened in the radial direction, having a rectangular or elliptic cross section, but also are reinforced to take up the outwardly directed radial pressures of the crucible.

It is another object of the invention to provide such cooling tubes which have a greater wall thickness on the parts facing the center axis of the crucible as compared to the parts facing the inner surface of the sleeve. In this case, each cooling tube may be composed of two parts of different wall thickness, and the two parts be welded together.

It is a further object of the invention to provide cooling tubes of the type referred to having uniform wall thickness, but being provided on the side facing the center axis of the crucible with a thick walled auxiliary sheet. In this case the cooling tubes may be made thin walled and seamless. An insulating layer of low conductivity characteristics may be inserted between the cooling tubes and the auxiliary sheet, and the entire aggregate be built into the rammed mass of the crucible.

It is still another object of the invention to provide one or more reinforcements, radially of the crucible, on the interior of the tubes, which may extend throughout the tube length or merely for a portion thereof.

The aforesaid objects offer the advantage to provide close to the inner surface of the sleeve thin walls of the cooling tubes, in order to retain a sufficiently high electric resistance in the direction of the rectified tube walls, so that the electro-magnetic alternating field of the coil will not cause any undue heating of the cooling tubes.

It is still a further object of the invention to make the tube walls and any reinforcements thereof, of austenitic, heat resistant steel.

It is yet another object of the invention to provide for additional heat insulation of the sleeve from the crucible, and for additional reinforcement against the radially outwardly directed pressures of the crucible, by the arrangement of a heat insulating layer that is sandwiched between the inner surface of the sleeve and the cooling tubes; this layer may be composed of mica, asbestos or fireproof felt.

It is yet a further object to provide in the gap between the external surface of the sleeve and the coil surrounding the sleeve a layer of self-hardening synthetic resin. The resin is poured into that gap in liquid form, to fill the gap free from any play; the aforesaid radially outwardly directed pressures are thereby transmitted from the sleeve onto the coil, which, in turn, is supported by the yokes and thence by the frame structure of the furnace.

The foregoing and other objects of the invention will be best understood from the following description of an exemplification thereof, reference being had to the accompanying drawings, wherein:

FIG. 4 is a fragmentary large scale horizontal sectional view, taken on the line IV—IV of FIG. 2; and FIG. 5 is a fragmentary large scale vertical sectional view, similar to FIG. 1 but showing a detail thereof.

Figure 1:
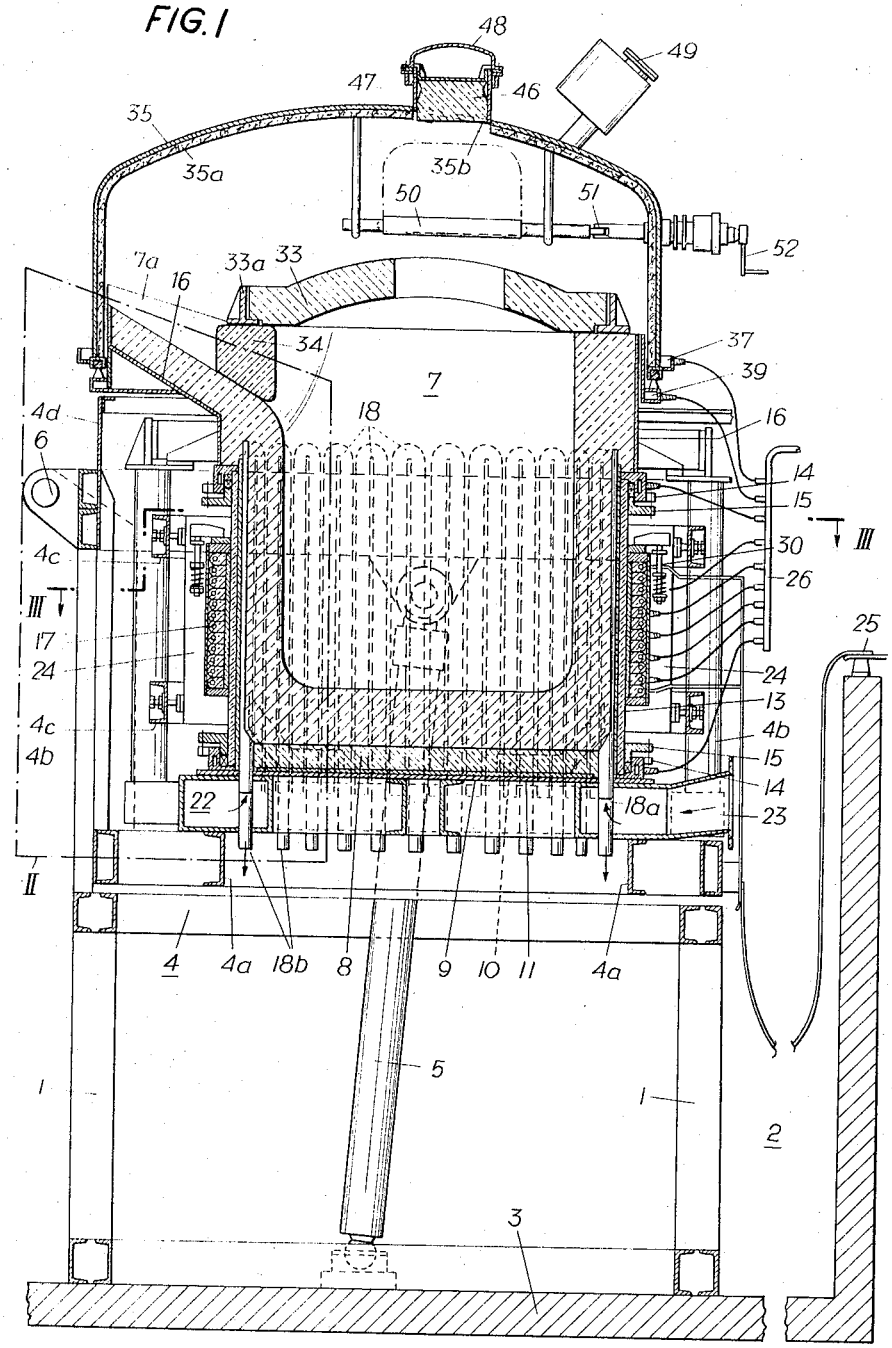
FIG. 1 is a fragmentary vertical sectional view of a vacuum induction furnace in accordance with the invention.
Figure 2:
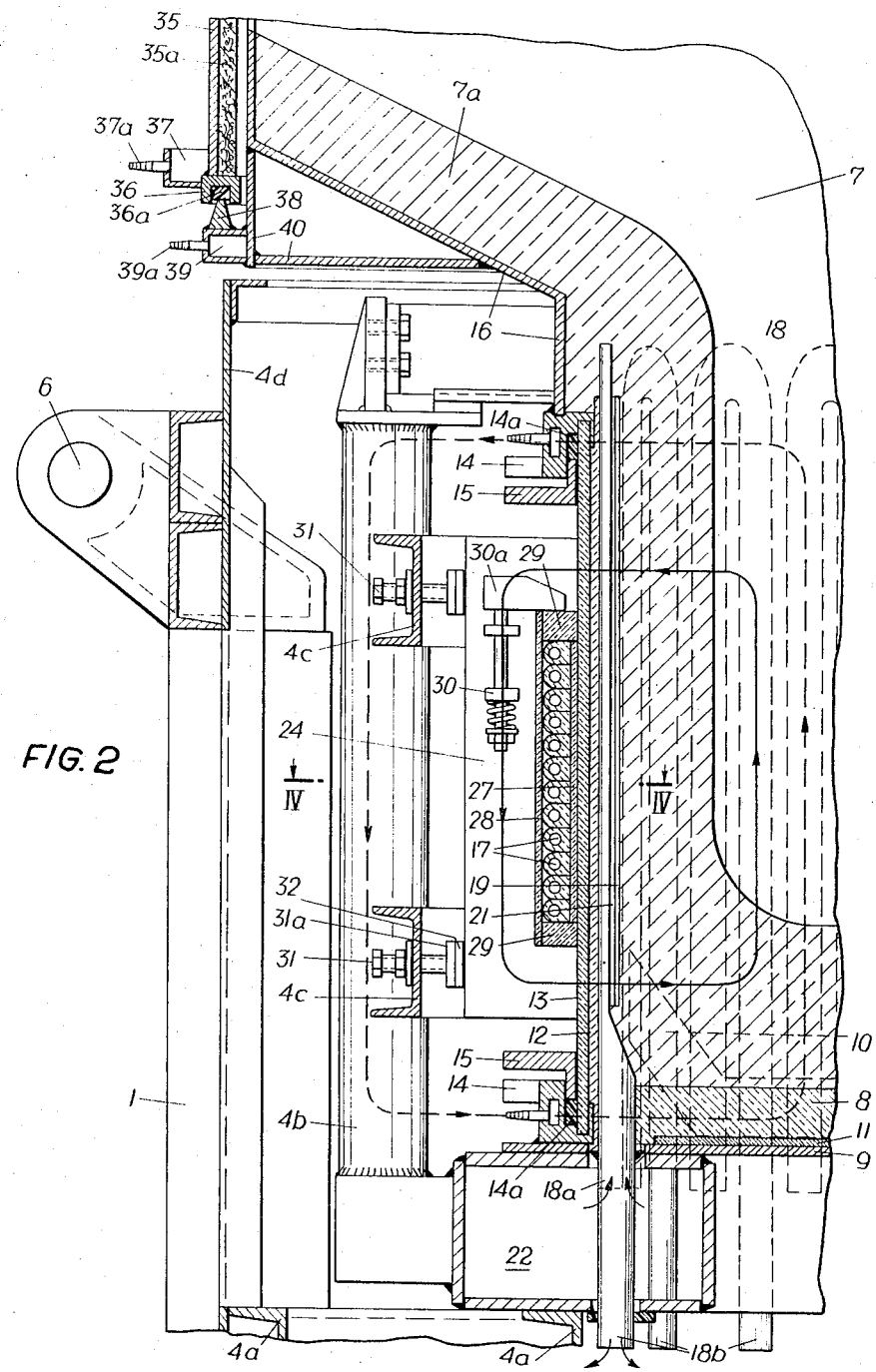
FIG. 2 is a fragmentary large scale vertical sectional view of a detail framed at II in FIG. 1.

In carrying the invention into effect in one of the embodiments which has been selected for illustration in the accompanying drawings and for description in this specification, and referring now particularly to FIGS. 1 and 2, there is provided an electric vacuum induction furnace which is supported on a framework 1. The framework 1 rests on a foundation 3 in a depression 2. A frame 4 is provided that is tiltable about hinges 6, and surrounds and is connected to and supports the furnace housing which, in turn, surrounds the crucible 7; the housing, on the other hand, is surrounded by and supports the coil and its reinforcements.

Furnace tilting means are provided which include a hydraulic cylinder 5 that is supported by the foundation 3 and can be actuated to tilt the frame 4 and therewith the furnace housing including the crucible 7 and the coil 17 about the substantially horizontal axis X of the hinges 6.

The frame 4 comprises a bottom structure that is composed of interconnected elongated steel beams and a series of six upright columns 4b which are arranged evenly distributed around a circle, furthermore of channel irons 4c that interconect the columns 4b to each other, and lastly an outer structure 4d. The frame 4 also comprises beams 4a that support the bottom of the crucible 7. The columns 4b serve to anchor the upper part, a steel mantle 16, of the housing for the crucible 7 to the lower part of that housing, as the furnace including its housing comprises an upper part and a lower part which are gas-tightly sealed on the exterior.

The bottom of the crucible 7 rests on a layer of refractory bricks 8 which, in turn, are supported by a plate 9 that covers the beams 4a. The plate 9 is made of non-ferritic metal and forms the lowermost closure of the vacuum chamber of the furnace.

In order to restrain losses by the occurrence of a stray field (shown in broken lines in FIG. 2, the direction of the stray currents being indicated by arrows) near the bottom of the crucible 7, and to impart instead to the stray field a desired extent and shape (shown in FIG. 2 in solid lines passing through the spring bolts 30), there are provided near the bottom additional magnetic yokes 10 composed of laminated heat insulated transformer steel sheets.

In order to shield still further the plate 9 against the stray field of the coil 17, there is provided a layer 11 that is composed of a material having high electric conductivity characteristics. The layer 11 is disposed below the yokes 10 and below the bricks 8.

Figure 3:
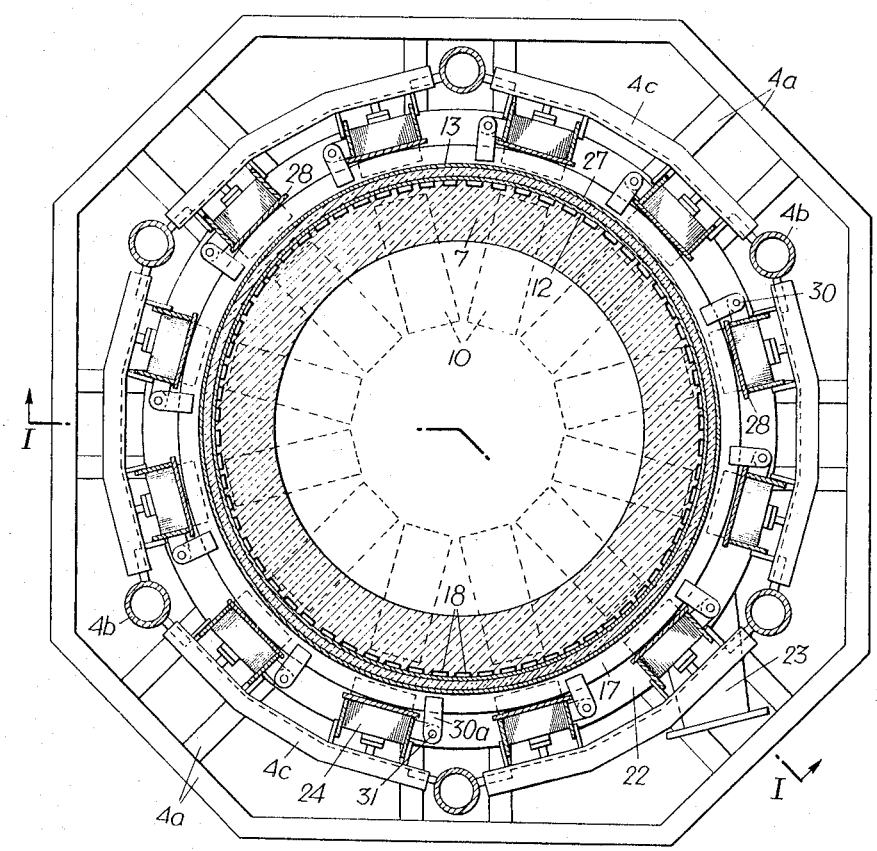
FIG. 3 is a horizontal sectional view taken on the line III—III of FIG. 1.

As best shown in FIG. 3, the outer wall section of the crucible 1 includes an insulating layer 12 that may be composed of mica, asbestos, or fireproof felt. A cylindrical sleeve 13 is placed without play around the insulating layer 12. The sleeve 13 is composed of a gas impermeable material of high mechanical strength, but of low electric conductivity, such as synthetic plastic or thermo-setting synthetic material or synthetic resin with or without reinforcements; this sleeve 13 forms the lateral vacuum seal for the crucible 7.

Vacuum sealing means are provided which comprise the cylindrical sleeve 13 that is composed of gas impermeable material having low electric and magnetic conductivity characteristics, such as synthetic plastic, plastic impregnated paper, or the like. The lower edge of the sleeve 13, as best shown in FIG. 2, is inserted into an annular groove that is formed by an annular flange 14 that is welded to the plate 9 and projects upwardly therefrom. The flange 14 may be hollow to provide a conduit for a cooling fluid, and is provided with connections for the entrance and exit of the cooling fluid.

The sealing of the sleeve 13 in the aforesaid annular groove is carried out by means of a packing 14a that is cooled by the aforesaid cooling conduit. The packing 14a is pressed downwardly by a pressure ring 15 that is forced down by screws 15a that connect the ring 15 with the annular flange 14 adjustably in the manner of a stuffing box. The pressure ring 15 is composed of an electrically non-conducting material such as plastic, self-hardening resin or non-ferritic metal; when it is made of non-ferritic metal, the pressure ring 15 is provided with at least one radial slot to prevent the passage of electric current.

The sleeve 13 extends downwardly beyond the coil 17, and extends upwardly beyond the electric range of influence of the coil 17. The upper end of the sleeve 13 is vacuum sealed in a manner similar to that of the lower end of the sleeve 13.

The packing 14a is received in a hollow groove that is formed by an annular flange 14 that has an internal conduit for a coolant.

The annular flange 14 of the upper part of the sleeve 13 is, however, connected to the steel mantle 16 that forms part of the housing of the furnace, and also, like the sleeve 13, forms part of the vacuum sealing means, and surrounds the upper part of the crucible 7 and surrounds the spout 7a.

The crucible 7 and the spout 7a are formed of rammed refractory material.

At the height of the alternating field that emanates from the coil 17, there are provided cooling means to cool the sleeve 13. These cooling means are provided inside the sleeve 13 and include a series of hair-pin shaped tubes 18. As best shown in FIG. 2, each tube 18 is bent back upon itself and is preferably composed of austenitic, heat resistant steel. The tubes 18 are embedded into the rammed mass of the crucible 7, and are disposed inwardly of an insulating layer 12 that is interposed between the tubes 18 and the sleeve 13. The tubes 18 are surrounded by a particularly fine ramming mass 19 composed of highly refractory material.

Each tube 18 is shaped like an inverted U and has both open ends 18a and 18b directed downwardly. Each tube 18 has a circular cross section at the entrance end 18a and the lower exit end 18b, while throughout the remainder of its length throughout which including its bend it is embedded in the mass, it has a flat cross section, narrow in the radial plane of the sleeve 13.

This flat squeezed shape serves the purpose to increase the cooling surface of the tubes 18 for the sleeve 13.

One or more cross braces 18c are provided in each tube 18 that interconnect the long sidewalls inside the tubes 18, and extend throughout the full, or only a part of the tube length, radially of the crucible 7, which serve to compensate for the reduced static strengtht in the aforesaid radial plane; these cross braces 18c preferably also are composed of austenitic, heat resistant steel.

In order to make the walls of the tubes as thin as possible, auxiliary sheets 20 are provided to take up pressures that are exerted by the molten metal radially outwardly, and between the sheets 20 and that side of the tubes 18 which faces the center of the crucible, there is provided an additional insulating layer 21. Each sheet 20 is preferably also made of austenitic steel, while the layer 21 is composed of material that has low electric and heat conductivity characteristics.

The aforesaid insulating layer 12 is composed of heat insulating material, for instance mica, asbestos, or fireproof felt.

The flattened tubes 18 may, for instance, either have rectangular or elliptic cross sections. In accordance with one embodiment of the invention, those portions of the tubes 18 which face the central axis of the crucible 7 may have a greater wall thickness than the portions that face the inner surface of the sleeve 13. Alternatively, where other reinforcing means are provided, for instance, the aforesaid auxiliary sheets 20, the tubes 18 may have uniform thin wall thickness and be seamless.

As best shown in FIG. 1, the shorter entrance ends of the tubes 18a terminate in an annular channel 22 that forms a part of the bottom support structure for the crucible 7. The annular channel 22 is provided with an entrance pipe for connection to a blower for the cooling fluid (not shown).

The annular channel 22 is supported on the beams 4a of the tiltable frame 4, and serves on one hand to support the bottom plate 9, and on the other hand serves to be connected to the columns 4b. The longer leg of each tube 18 has its exit end 18b projecting axially through the annular channel 22 into the atmosphere, for the discharge of the cooling fluid.

The sleeve 13 is surrounded, along a portion of its height, by the coil 17. A series of twelve C-yokes 24 are arranged evenly spaced from each other circularly about the coil 17 to the exterior thereof. Each yoke 24 is composed of lamellae of transformer sheet metal.

As best shown in FIG. 1, a terminal 25 is provided for the electric current for interconnecting the coil 17 with the network; and a connection 26 is provided for interconnecting the coil 17 with a cooling liquid that courses, in a well-known manner, in the interior of the hollow coil 17. The conduits 14 for cooling the sealing devices heretofore described are also connected to the connection 26. The cooling conduits for the sealing devices hereafter described are also connected to the connection 26.

As best shown in FIG. 2, the space between the inner surface of the coil 17 and the outer surface of the sleeve 13 is filled with a layer 27 of liquid self-hardening resin, in order to take up the radially outwardly directed pressures of the ceramic material of the crucible 7, and to transfer it to the frame of the furnace.

An insulation 28 composed of mica, asbestos or fireproof felt is provided between the coil 17 and the yokes 24 that surround the coil 17.

As best shown in FIG. 2, the coil 17 is supported at its lower end by the inner leg of the yokes 24 and an insulating layer 29 thereon. To take up the electro-mechanical forces which occur in the windings of the coil 17 during the operation of the furnace, there are provided fingers 30a and a spring loaded anchor bolt 30. The fingers 30a press, by means of an insulating layer 29, against the upper portion of the coil 17. Each spring loaded anchor bolt 30 is connected to a yoke 24.

Reference is had to my Patent No. 2,852,587, dated September 16, 1958.

As best shown in FIG. 4, the yokes 24 are bolted to struts 40 that interconnect the columns 4b. The yokes 24 are so positioned that they can be adjusted at the upper end as well as the lower end by means of an adjusting screw 31. The adjustment serves to promote a steady radial pressure of the yokes 24 against the coil 17. An insulating layer 32 is provided between the pressure piece 31a of the adjusting screw 31 and the lamellaed steel package of the yokes 24; the insulating layer 32 is composed either of mica, or asbestos, or fireproof felt.

The crucible 7 is open on top and is covered, except for that part which leads into the spout 7a, by an inner cover 33. The cover 33 is vaulted and is composed of refractory bricks which are held together by a metal frame 33a. When the furnace is in operation, a stopper 34, which is also composed of refractory material, closes the open channel that leads to the spout 7a.

A bell-shaped outer lid 35 is provided that surmounts the crucible 7, the inner cover 33, as well as the spout 7a. The outer lid 35 is composed of steel sheet, and is lined on the interior with a fireproof insulation layer 35a.

The lower rim of the outer lid 35 has an inverted annular groove 36 which is filled with a deformable sealant 36a. On the exterior, the lid 35 has near the groove 36 an annular cooling conduit 37 which is provided with fittings 57a to be connected to the cooling connection 26.

The lid 35 rests with the sealant 36a on the apex of an annular wedge-shaped upright sealing ridge 38 that is formed on an annular carrying flange 39. The carrying flange 39 is hollow and has an internal conduit for a cooling fluid including a fitting 39a to be connected to the cooling connection 26. The carrying flange 39, by means of connecting struts 40, is welded to said steel mantle 16, and therefore is united therewith.

The inner cover 33 has a central aperture or opening 33b and the outer lid 35 has an opening 35b in register therewith. These openings 33b and 35b serve for the sampling of the molten metal mass or the adding of alloying material. Both openings may be closed. The opening 35b may gastightly be closed by a stopper 46 and, in connection with a superstructure 47, be sealed with a cap 48 which works according to the same principle as the lid 35 itself in connection with the sealing device that comprises the deformable sealant 36a, the ridge 38 and the cooling conduits 37 in the flange 39, as previously described. An objective 49 is provided that is sealed to the outer lid 35 and which permits viewing through the aperture 33b of the crucible 7 during operation of the furnace.

The aperture 33b of the inner cover 33 may be closed by a flap 50 that is composed of refractory material and is manipulated from the exterior at 52 and is pivoted at 51.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a coreless induction furnace for large capacity charges, the combination of, a crucible, a primary induction coil adapted to be fed from an electric source surrounding said crucible, vacuum sealing means comprising a furnace housing, a sleeve including gas impermeable material having low electric and magnetic conductivity characteristics disposed between said coil and said crucible, and gastight upper and lower closure means operable for airtightly closing the upper and, respectively, the lower ends of said vacuum sealing means and defining a vacuum chamber housing said crucible, and cooling means for said sleeve disposed adjacent the inner surface of at least a portion of said sleeve, said cooling means comprising a series of hair pin tubes, each tube being bent back upon itself and extending axially of the crucible adjacent the inner surface of said sleeve, each tube being flattened in the radial direction of the crucible and being reinforced to take up pressures exerted radially outwardly by the crucible.

2. In a coreless induction furnace, as claimed in claim 1, each tube being composed of tube parts of different wall thickness, the part of greater wall thickness of each tube facing the central axis of the crucible and the part of smaller wall thickness facing the inner surface of said sleeve.

3. In a coreless induction furnace, as claimed in claim 1, and an auxiliary reinforcement sheet disposed adjacent that portion of the wall of each tube facing the center of the crucible.

4. In a coreless induction furnace, as claimed in claim 3, together with, an insulating layer disposed between each tube and its auxiliary sheet, said insulating layer having low electric and heat conductivity characteristics.

5. In a coreless induction furnace, as claimed in claim 1, at least one reinforcement radially of the crucible positioned inside each cooling tube and interconnecting the opposite wall portions thereof.

6. In a coreless induction furnace, as claimed in claim 1, the reinforced tubes being composed of austenitic heat resistant steel.

7. In a coreless induction furnace, as claimed in claim 1, together with, an annular insulating layer disposed between said series of tubes and said sleeve and being composed of heat insulating material taken from the group consisting of mica, asbestos, and fireproof felt.

8. In a coreless induction furnace, as claimed in claim 1, together with said coil defining with the external surface of said sleeve an annular gap, an insulating layer of self-hardening synthetic resin filling said gap free from any play and being poured in liquid form and being upon hardening operable to transmit outwardly radially directed pressures from the sleeve to the coil.

References Cited by the Examiner
UNITED STATES PATENTS 3,056,847  10/1962  Junker _____ 13—27

RICHARD M. WOOD, *Primary Examiner.*

L. H. BENDER, *Assistant Examiner.*